United States Patent [19]

Ogrinc et al.

[11] Patent Number: 5,641,263
[45] Date of Patent: Jun. 24, 1997

[54] BUNDLE UNSCRAMBLER

[75] Inventors: Joseph Ogrinc, Cincinnati; Glenn C. Huff, Englewood; Kevin Stryker, Arcanum; Robert Q. Clark, Dayton, all of Ohio

[73] Assignee: Vulcan Tool Corporation, Dayton, Ohio

[21] Appl. No.: 587,734

[22] Filed: Jan. 19, 1996

[51] Int. Cl.$^6$ ................................................ B65G 15/08
[52] U.S. Cl. .................... 414/745.9; 198/443; 198/463.5; 414/746.4; 414/786
[58] Field of Search ......................... 198/443, 463.5; 414/745.9, 746.4, 786

[56] References Cited

U.S. PATENT DOCUMENTS

| | | | |
|---|---|---|---|
| 3,214,001 | 10/1965 | Callaghan | 414/745.9 X |
| 3,506,142 | 4/1970 | White . | |
| 3,757,964 | 9/1973 | Kaplan . | |
| 3,871,288 | 3/1975 | White | 100/2 |
| 5,017,074 | 5/1991 | Fabbri | 414/224 |
| 5,346,304 | 9/1994 | Kleinhans | 366/219 |

FOREIGN PATENT DOCUMENTS

| | | | |
|---|---|---|---|
| 0339488 | 11/1989 | European Pat. Off. | 198/443 |
| 2234441 | 1/1974 | Germany | 198/443 |

*Primary Examiner*—Karen B. Merritt
*Assistant Examiner*—Janice L. Krizek
*Attorney, Agent, or Firm*—Thompson Hine & Flory LLP

[57] ABSTRACT

An unscrambler for unscrambling a bundle of elongated tubes comprises a plurality of forward belt-support columns, a plurality of aft support columns, a plurality of flexible belts suspended in parallel between the forward and aft support columns forming a belt magazine for retaining the bundle of tubing which extend longitudinally in a direction perpendicular to the belts, and a plurality of ramps positioned longitudinally between each pair of adjacent belts sloping upwardly towards the forward support columns and positioned such that they provide support for the bundle in the belt magazine. The ramps each have a wedge extending from their upper surfaces, and each wedge has a forward face which intersects the upper surface of the ramp to form a v-shaped groove on the ramp. Furthermore, each of the belts have a cleat attached to their upper surfaces. Tightening of the belts causes the bundle to be guided up the ramps and lifted above the wedges on the ramps such that the bundle expands outwardly. Subsequent slackening of the belts causes the expanded bundle to be lowered onto the wedges such that the wedges separate a portion of the tubes from the bundle and such that the v-shaped grooves retain the separated portion of tubes on the ramps. Tightening of the belts again causes the cleats to engage and convey the separated tubes from the ramps to a magazine ramp adjacent the forward support column.

31 Claims, 8 Drawing Sheets

BUNDLE UNSCRAMBLER

BACKGROUND OF THE INVENTION

The present invention relates to a bundle loader and unscrambler, and more particularly to a method and apparatus for unscrambling flexible bars or tubes from a bundle of such tubes.

Prior art bundle loaders and unscramblers typically utilize an apparatus having several parallel belts slung between elevated supports on a frame, forming a festoon-type bundle magazine suspended between the elevated supports. The bundles of tubing are initially positioned in this bundle magazine in a longitudinal direction perpendicular to the suspended belts.

The unscrambling of the bundle is often effected by repeatedly raising and lowering the bundle, which causes relative movement between the bars; or alternatively, is effected by lowering the bundle against fixed platforms such that most of the weight is transferred from the belts to the platforms, and such that the upper surfaces of such platforms cause loose bars in the bundle to move outwardly from the bundle and engage a flat surface of the platform.

Once loosened, the bars are then separated from the bundle by conveying the belts over the elevated supports on one side of the frame such that the bundle is essentially lifted to those supports, and such that bars loosened from the bundle can be carried over the supports and deposited onto a storage ramp or bar feeder adjacent to the supports. Examples of such festoon-type unscramblers can be found in U.S. Pat. Nos. 3,506,142, 3,871,288, 3,979,018, and 5,017,074.

While such prior art apparatuses are sufficient for unscrambling and loading rigid bars having lengths of 20 feet or less, they are unable to effectively unscramble bars or tubing having lengths of up to 40 feet or more, especially if light-weight bars or hollow tubing are being loaded. This is because as the length of the tubing or bars increases, the overall rigidity of the tubing or bars substantially decreases, and thus the tubing or bars have a significant propensity to twist and tangle in a spaghetti-like fashion. Furthermore, the above separating step of lifting of the bundle to the supports by conveying the belts over the elevated supports, causes the previously loosened bundle to be compressed again such that much of the previous loosening of the bundle is undone. Therefore, the above methods of unscrambling and separating rigid bars from a bundle are insufficient to unscramble and separate flexible tubing or bars twisted in a tangled bundle.

Therefore, it is desirable to have an apparatus and method which can unscramble bundles of flexible tubing or bars, and especially, which can unscramble bundles of tubing or bars having lengths of upwards of 40 feet or greater.

SUMMARY OF THE INVENTION

The present invention provides a method and apparatus for unscrambling bundles of flexible bars or tubing, and especially for unscrambling bundles of light-weight bars or tubing having lengths of upwards of 40 feet or more.

In accordance with the present invention, the unscrambler comprises a belt magazine formed by a plurality of parallel belts suspended between elevated rear and forward support members. The bundle is initially placed in the belt magazine such that the bundle extends longitudinally in a direction perpendicular to the belts. The belts are preferably fixed to the rear support members, and are engaged with the forward support members such that they can be moved forward and backwards along the forward support members thereby allowing the belt magazine to be correspondingly tightened and loosened.

Adjacently positioned between each of the suspended portions of the belts are ramps. Each ramp is sloped upwardly towards the forward supports, and each ramp has a wedge-like projection extending from the upper surface of the ramp, between the base and the apex of the ramp. The forward surface of each wedge intersects with the upper surface of the ramp to form a v-shaped groove on the ramp.

Further, many of the belts have a cleat attached to their inner bundle receiving surfaces.

In operation the bundle, initially placed in the bundle magazine longitudinally perpendicular to the suspension of the belts, is first expanded by tightening the suspended portion of the belts between the forward and rear supports, by driving the belts forward over the forward supports. The tightening of the belts conveys the bundle up the ramps, and lifts the bundle above the ramps and associated wedges. This tightening and lifting of the belts suspended between the forward and rear support members operates to cause the bundle to laterally expand such that tubes loosen and untangle from the bundle and roll to the lateral edges of the bundle.

At this point the tubes positioned at the forward edge of the expanded bundle, whether loosened or not, are separated from the bundle by lowering the bundle onto the wedges such that the wedges separate the forward edge portion of the tubes from the rest of the bundle. The separated tubes are retained in the v-shaped grooves on the ramps, while the rest of the bundle continues down the portion of the ramp below the wedge.

The separated tubes retained in the v-shaped grooves are conveyed to the discharge magazine by driving the belts forward again over the forward supports such that the cleats catch on the separated bars, and such that the tubes engaged by the cleats traverse over the forward supports thereby pushing the separated tubes over the supports and onto the discharge magazine shelf.

The above steps can be repeated continuously until the desired number of bars are separated and loaded onto the discharge magazine shelf. Furthermore, this operation can be completely automated, and such automation would merely require the inclusion of several conventional sensors and a control program.

Accordingly an object of the invention is to provide a bundle unscrambler for unscrambling flexible tubes or bars from a bundle of such tubes or bars.

It is a further object to incorporate this invention into a festoon-type unscrambler, such that existing festoon-type unscramblers can be retrofitted with the means to perform the invention, and such that the development of new unscramblers embodying the invention will be relatively uncomplicated.

These and other objects and advantages of the present invention will be apparent from the following description, the accompanying drawings and the appended claims.

DETAILED DESCRIPTION

Figure 1:
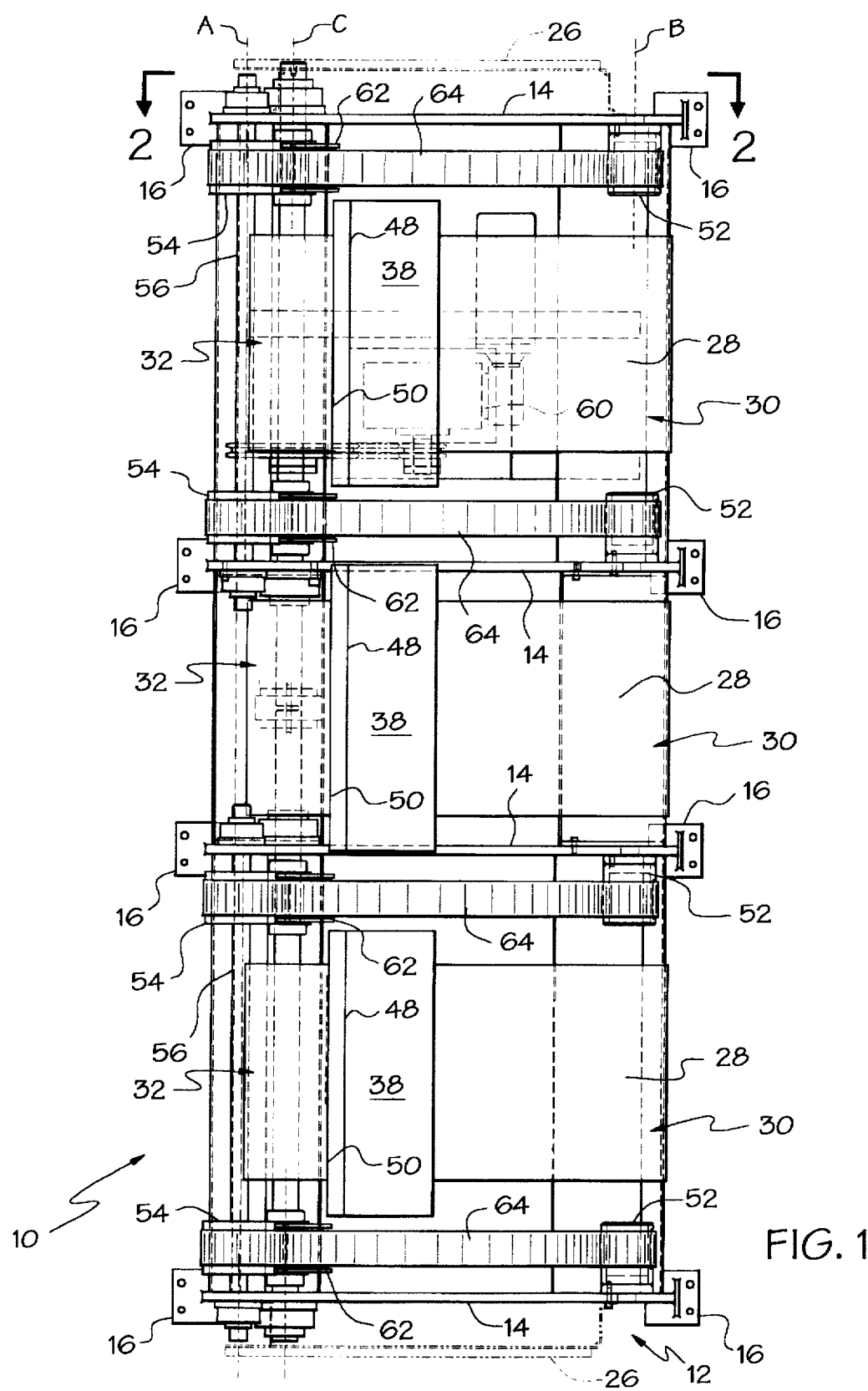
FIG. 1 is a top elevational view of the apparatus of the present invention.
Figure 2:
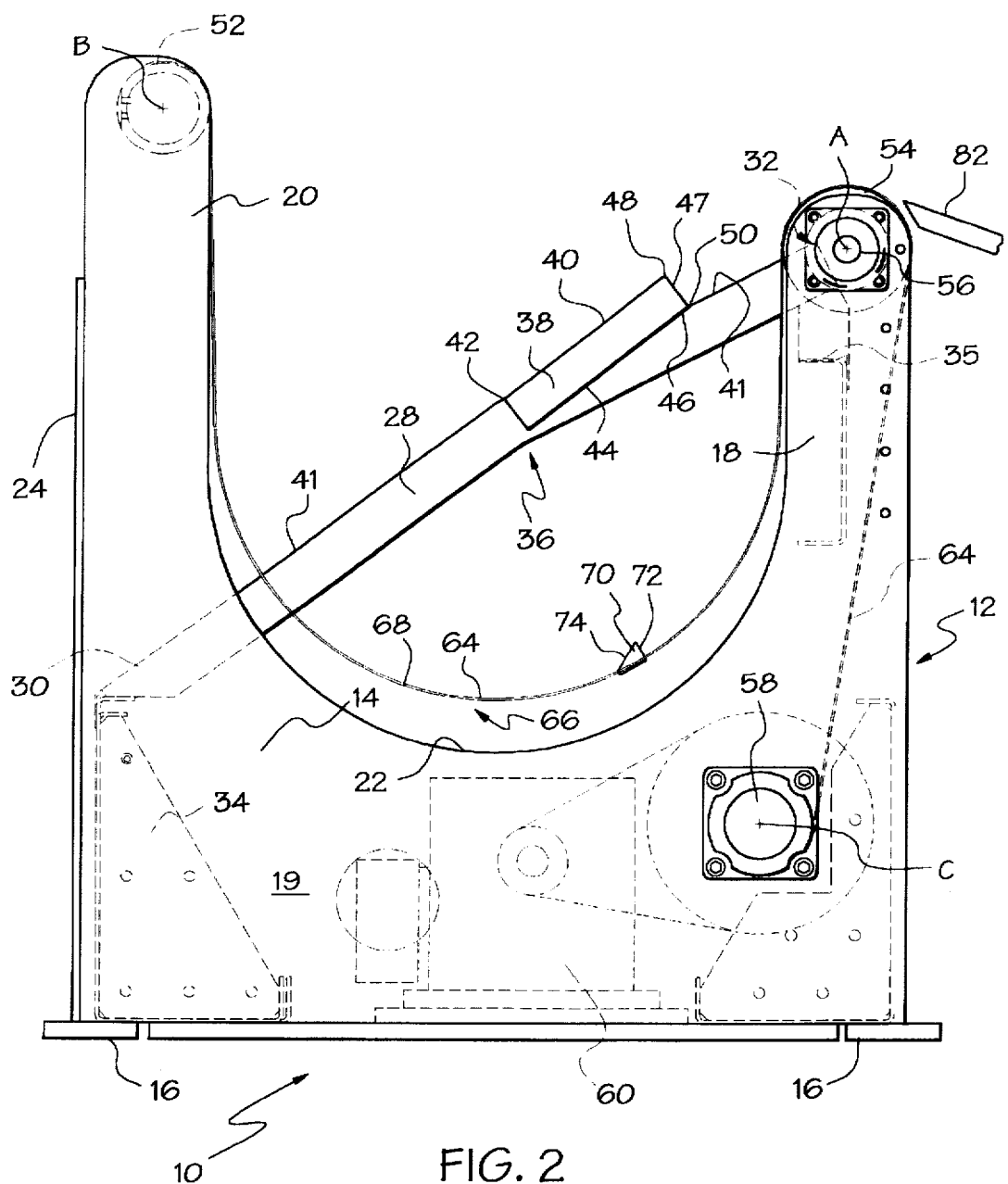
FIG. 2 is a vertical section view of the apparatus taken along the line 2—2 of FIG. 1.

As is shown in FIGS. 1 and 2 the unscrambler 10 has a frame 12 consisting of a plurality of belt-support panels 14 mounted on a plurality of base platforms 16. Each belt-support panel 14 has a forward support column 18, a base portion 19, and an aft support column 20. The base portion has a concave upper surface 22 flush with the interior surfaces of the forward and aft support columns. The frame also comprises rear support panels 24 and side enclosure panels 26.

Mounted between each of the belt-support panels 14 are ramps 28 having bases 30 approximate the aft support columns 20, and having their apexes 32 approximate the forward support columns 18. The ramps 28 slope upwardly from the aft support column towards the forward support column. The ramps 28 are elevated from the ground by ramp support members 34, 35. This is to position the ramps such that the ramps can provide additional support to the bundle, and such that the ramps assist in laterally condensing the bundle prior to the bundle expansion step as will be explained in detail below.

The ramps are angled upwardly from the ramp support members 34 at an initial angle of X; and at a point approximately midway between the base and apex of the ramps, the ramps have an elbow portion 36 whereby the portion of the ramps above the elbow portions 36 rise at an angle Y, smaller than the initial angle X. Each ramp extender plate 38 is integrally mounted on each ramp 28 above the elbow portion 36. Each ramp extender plate 38 has an upper surface 40, at the ramp extender plate's aft end 42, flush with an upper surface 41 of ramp 28 substantially at the elbow 36 of the ramp. Each ramp extender plate also has a lower surface 44 resting on the upper surface 41 of the ramp 28 at the ramp extender plate's forward end 46. Therefore, a forward surface 47 of each ramp extender plate 38 projects from the ramp 28 to form a wedge or ridge 48 projecting from the ramp 28; and the intersection of the forward surface 47 of each extender plate 38 with the upper surface 41 of the ramp, forms v-shaped groove 50 on the ramp 28, above the ridge In addition to the preferred ramp 28 and ramp extender plate 38 design as described above, it will be apparent from the operation of the unscrambler, as described below, that any projection extending from a ramp sloping upward towards the forward support column 18, capable of wedging between and separating tubes from a bundle of tubes as the bundle is being lowered from above the projection, and capable of retaining the separated tubes on the ramp, will fall within the scope of the invention.

Each aft support column 20 has a rigid support drum 52 mounted thereon, and each rigid support drum 52 is mounted along a longitudinal axis B. Each forward support column 18 has a roller drum 54 mounted for rotation on a roller drum shaft 56 extending between that forward support column and a forward support column of an adjacent belt-support panel 14. Each roller drum shaft 56 is mounted on longitudinal axis A, parallel to axis B; and each roller drum 54 is longitudinally positioned in alignment with a corresponding rigid support drum 52. A drive shaft 58 is mounted longitudinally through the forward end of the frame on longitudinal axis C, parallel to axes A and B. The drive shaft 58 is driven by a reversible motor 60. A plurality of take-up pulleys 62 are mounted on the drive shaft, each of which is mounted in longitudinal alignment with a corresponding roller drum 54 and support drum 52.

A plurality of parallel extending belts 64 are each attached at one end to a rigid support drum 52, are engaged over a corresponding roller drum 54, and are attached at the other end to a corresponding take-up pulley 62. Therefore, each belt 64 is suspended between the forward and aft supports 18, 20, perpendicular to axes A, B and C, having a suspended portion 66 between the forward and aft supports 18, 20. The suspended portions 66 of the belts form a belt magazine for the bundle of tubing to be unscrambled.

Clockwise rotation of the drive shaft 58 will pull the belts 64 forward over the roller drums 54, and will in turn decrease the lengths of the suspended portions 66 such that the suspended portions 66 are tightened. Counter-clockwise rotation of the drive shaft 58 will drive the belts aftward over the roller drums 54, and will correspondingly increase the lengths of the suspended portions 66 such that the suspended portions are slackened.

The belts 64 are preferably made of a nylon and polyester material, however, any type of flexible belt, chain, mesh, strap, rope, wire, or similar means capable of supporting the bundle and capable of being driven forward and aftward along the roller drums 54 will fall within the scope of the invention.

Each of the belts 64 has an upper surface 68 with a cleat 70 attached thereon. The cleats 70 each have a flat forward surface 72 for engaging tubes, and an angled rear surface 74. As will become apparent below, however, any type of projection attached to the upper surfaces 68 of the belts 64, and capable of engaging with and holding tubes on the belts can be substituted for the cleats 70 and will thus fall within the scope of the invention.

Each belt 64 and corresponding belt-support panel 14, rigid support drum 52, roller drum 56, and take-up pulley 62 (the "belt-support panel assembly") is preferably uniformly spaced in the longitudinal direction. And the number of belts and corresponding belt-support panel assemblies required depends upon the length and rigidity of the tubes or bars in the bundle, and preferably is the amount necessary to keep the bundle substantially straight, i.e. without bending or bowing. Nevertheless, at least two belts and corresponding belt-support panel assemblies are required—one approximate each end of the bundle.

For the purpose of providing an example, when the unscrambler is used to unscramble 40' long, ½" to 1¼" diameter copper or steel hollow tubing, having 0.035" walls, it is recommended that ten belts 64 and corresponding belt-support panel assemblies be provided and uniformly spaced in the longitudinal direction. Also, because of the ten belt-support panel assemblies being provided, the example unscrambler will correspondingly have nine ramps 28 provided adjacently between each of the belt-support panel assemblies.

Similarly, the number of cleats 70 utilized also depends upon the rigidity of the tubing or bars, and is preferably the amount necessary to keep the tubing or bars substantially straight as the cleats convey the tubes or bars from the ramps 28 as described below. Therefore, not every belt 64 needs to have a cleat 70 attached to its upper surface 68; however, at least two of the belts should have cleats attached thereon.

Figure 3:
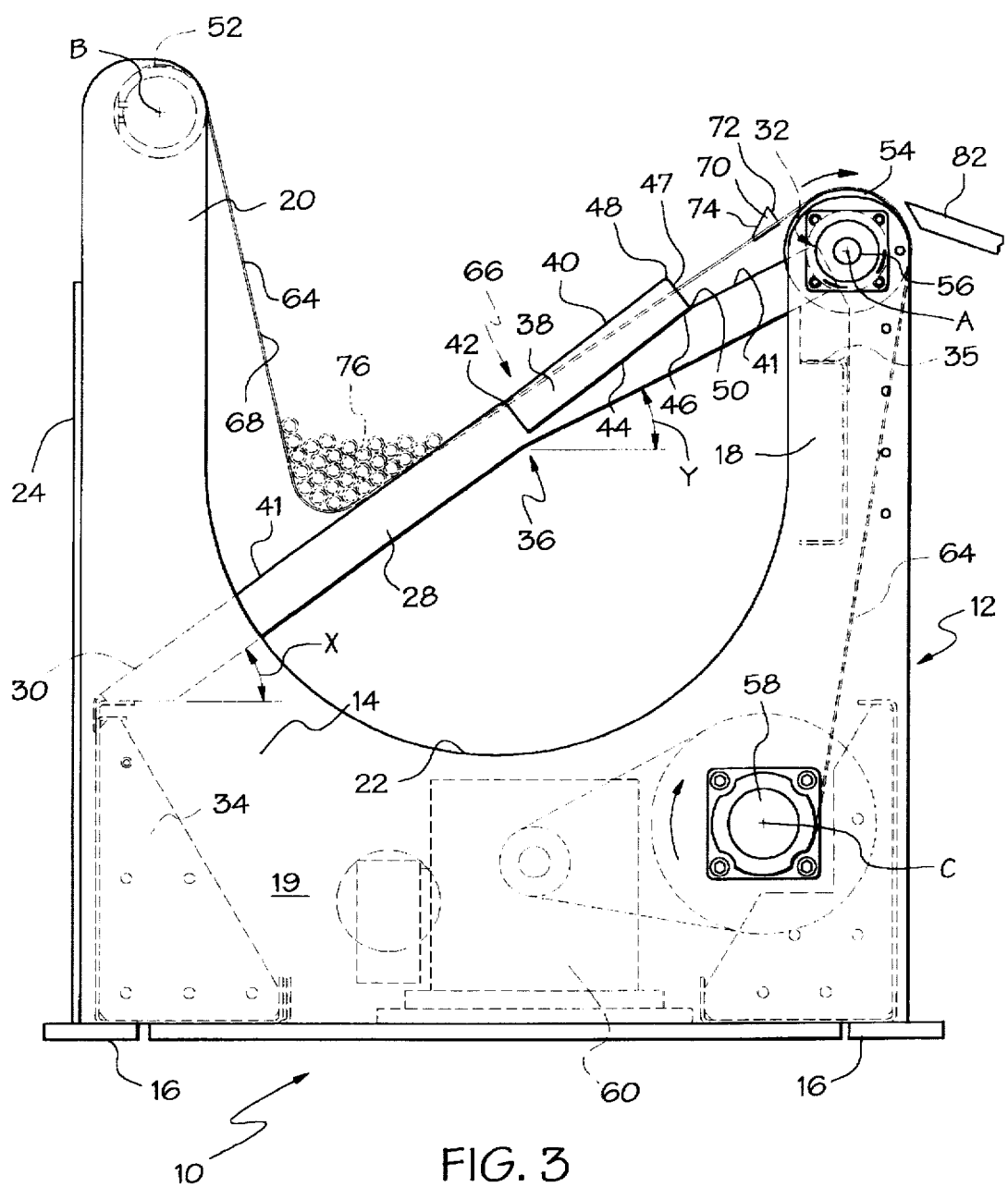
FIG. 3 is the view of FIG. 2 showing initiation of the expanding step of the unscrambling method of the present invention.

The operation of the unscrambler is generally as follows: As shown in FIG. 3 the bundle of tubes 76 is initially placed longitudinally across the suspended portions 66 of the belts 64 forming the belt magazine. The weight of the bundle 76 is supported both by the ramp 28 and the belts 64. As the drive shaft 58 is rotated clockwise the belts are pulled forward across the drum rollers 54 (causing the drum rollers to rotate in a clockwise direction), which tightens the suspended portions 66 of the belts 64 and pulls the bundle 76 up the ramps 28 towards the ridges 48. The initial angle X of the ramps 28, in combination with the tension on the belts 64, acts to keep the bundle 76 condensed as it is being pulled up the ramps. Preferably the initial angle X of the ramp 28 is 36° 30°'; however, it is within the scope of the invention that the angle X range from 35° to 40°.

Figure 4:
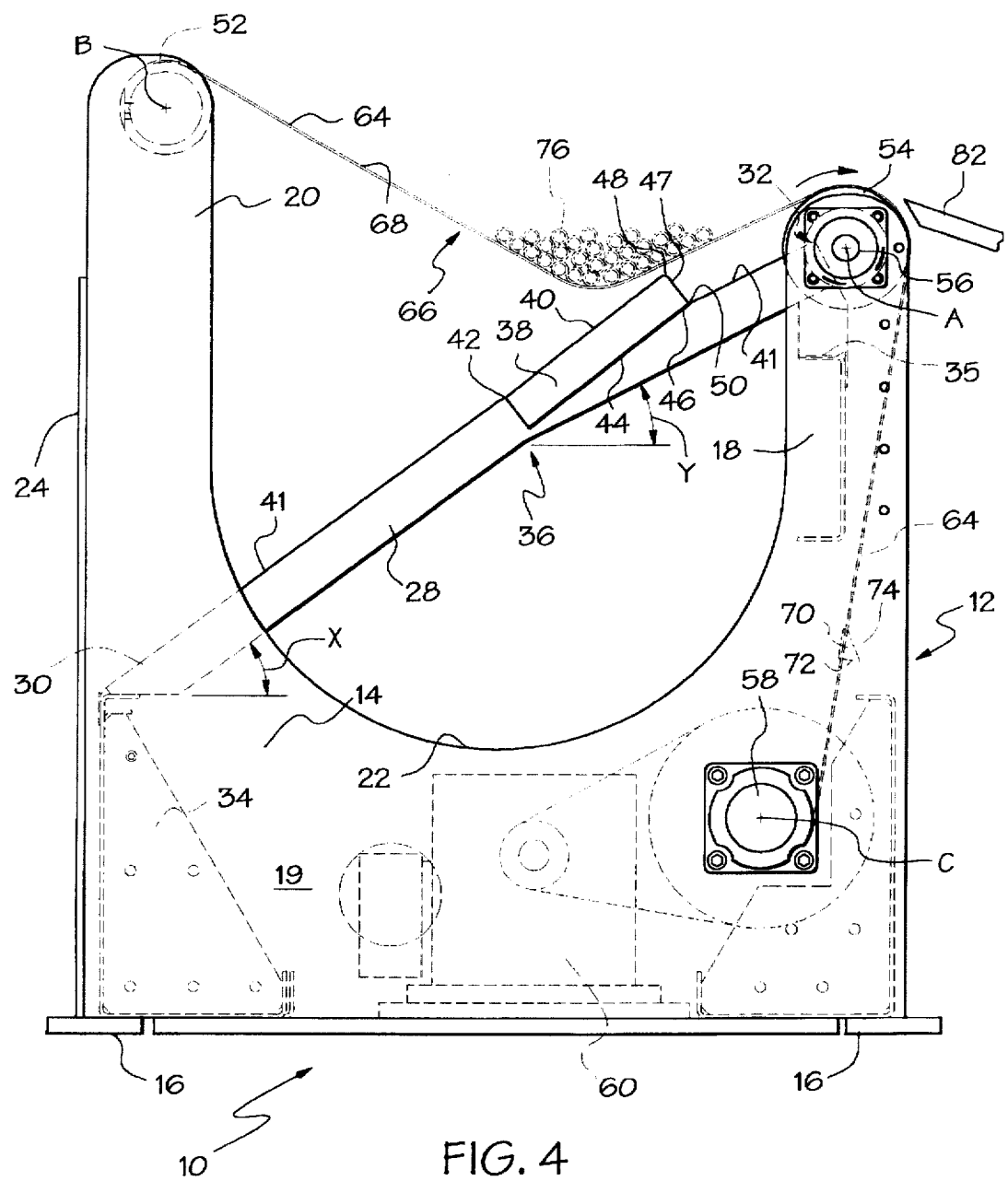
FIG. 4 is the view of FIG. 2 showing a later stage of the expanding step of the unscrambling method of the present invention.

As shown in FIG. 4 the belts 64 are further tightened such that the bundle 76 is lifted over the ridges 48 of the ramps 28 and allowing for significant lateral expansion of the bundle. This quick change from condensation of the bundle, caused by the angle of the ramps while the bundle is being conveyed up the ramps, to significant lateral expansion of the bundle, caused by an absence of the ramps' support and further caused by the substantial tightening of the suspended portions of the belts, operates to significantly loosen and untangle tubes from the bundle. And frequently, loosened tubes will roll to the forward and aftward edges of the bundle as the bundle is expanded and lifted over the ramp.

Figure 5:
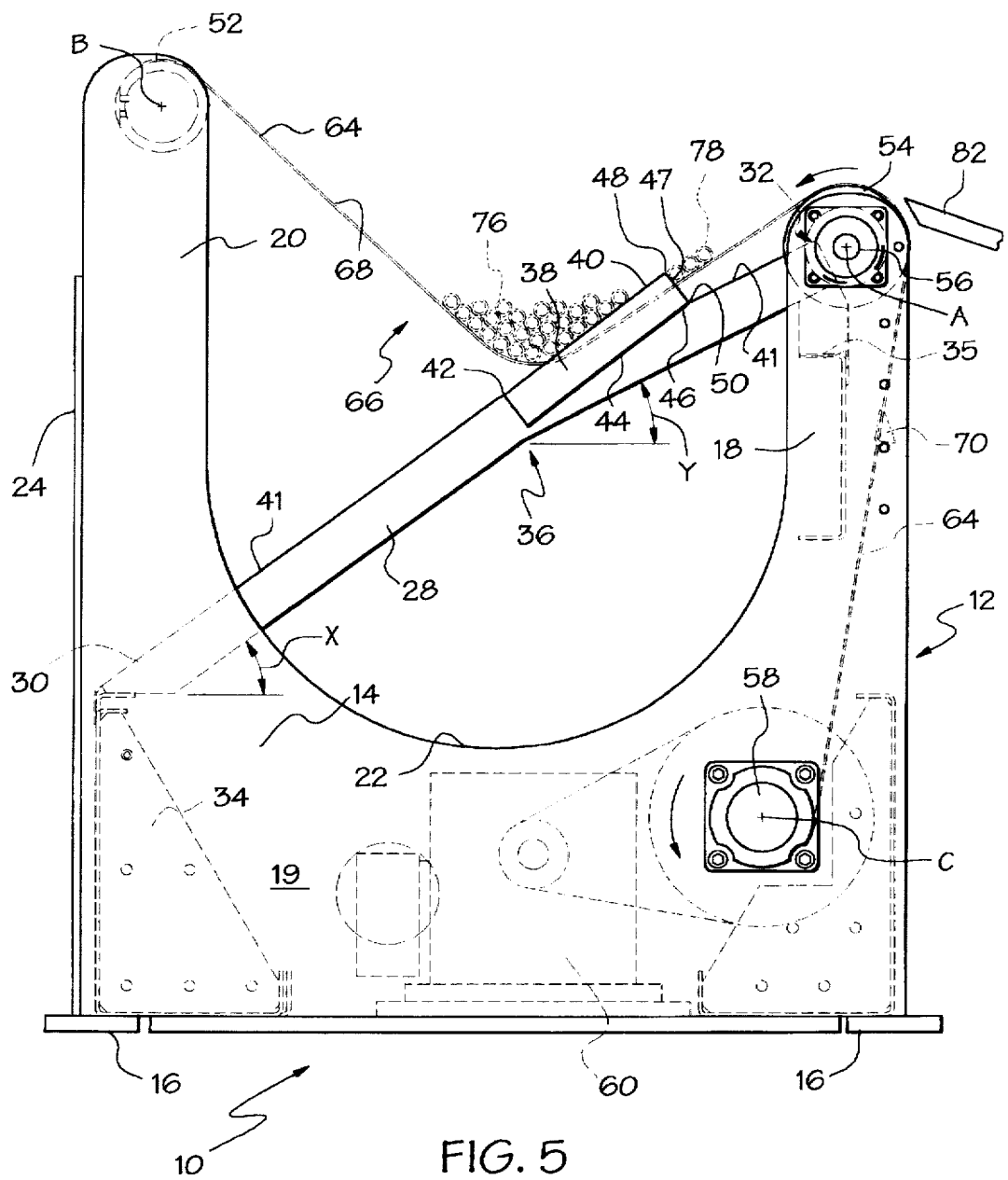
FIG. 5 is the view of FIG. 2 showing the separating step of the unscrambling method of the present invention.
Figure 6:
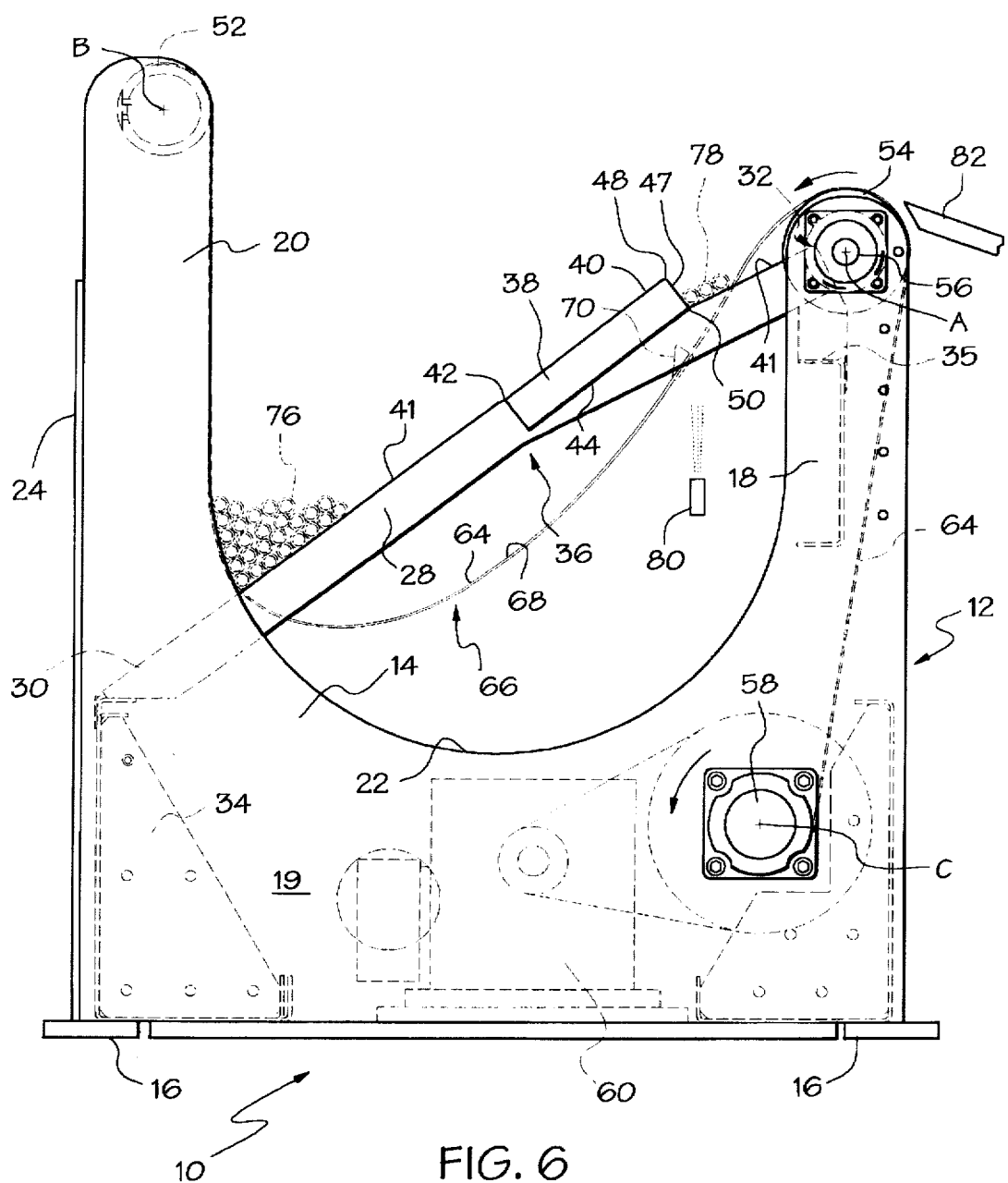
FIG. 6 is the view of FIG. 2 showing the initial step of the unscrambling method of the present invention.

As shown in FIG. 5, the belts 64 are again slackened by the counterclockwise rotation of the drive shaft 58. This slackening of the belts allows the bundle to be lowered below the level of the ridges 48, such that the ridges 48 act as a wedge to engage and separate the forward-most portions of the tubes 78 from the expanded bundle 76. And, as shown in FIG. 6, as the belts 64 are loosened further, causing the bundle 76 to be accordingly lowered further, the v-shaped grooves 50 retain the separated tubes 78 on the ramps 28.

At this point, a sensor 80 is preferably used to detect whether any tubes have been deposited onto the v-shaped grooves 50; and if no tubes are detected, the steps of expanding and separating are preferably repeated until at least one tube is deposited in the v-shaped grooves 50. The sensor 80 is preferably a conventional photoelectric proximity switch sensor such as a SICK Optical Sensor model QT-24. However, it is within the scope of the invention that any conventional sensor capable of sensing the presence of tubes in the v-shaped grooves may be used.

At this point it should be apparent to one of ordinary skill in the art that the separating and retaining means need not be a ramp, or a projection positioned on a ramp, as disclosed in the preferred embodiment. A retainer such as a platform having a v-shaped, u-shaped, or notched upper surface, for example, can act to separate and retain tubes from the bundle as the bundle is being lowered below the level of the platform's upper surface. A ramp can also be used in combination with an alternate retainer such as the above platform to provide the preferred support, at the preferred angle, for the bundle as the belts are being tightened.

Figure 7:
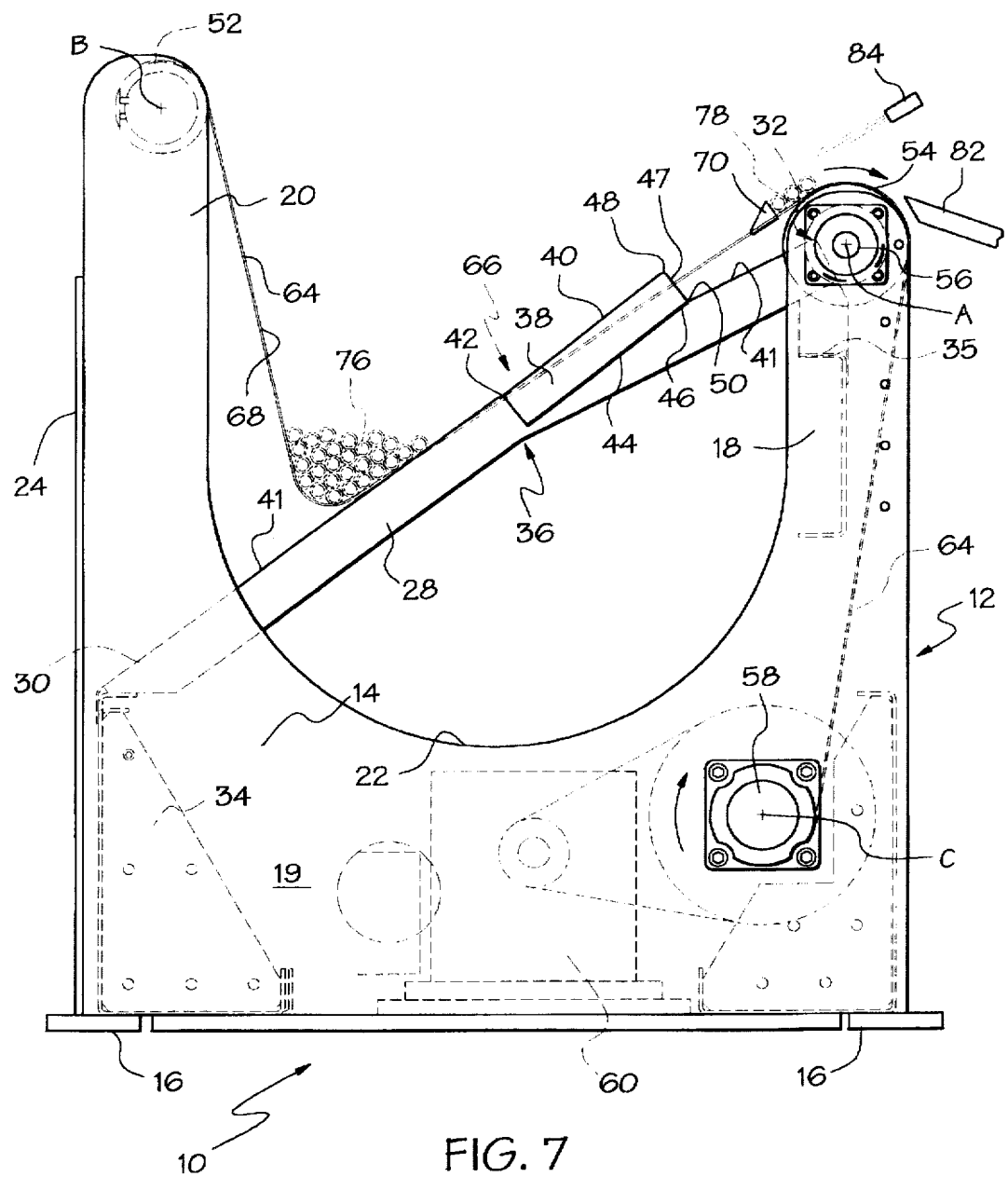
FIG. 7 is the view of FIG. 2 showing the discharging step of the unscrambling method of the present invention.

Referring back to the preferred embodiment, once separated tubes 78 are detected in the v-shaped grooves 50 on the ramps, as shown in FIG. 7, the drive shaft 58 is again driven clockwise to tighten the belts 64, and to drive the belts over the roller drums 54. As the belts are driven forward, the forward surface 72 of the cleats engage the separated tubes 78 deposited in the v-shaped grooves 50 and convey the separated tubes 78 over the roller drums 54 and onto a storage ramp or bar feeder 82. Preferably, the height of the forward surface 72 of each cleat is approximately equal to the diameter of one tube. This is because the separated tubes 78 are sometimes still entangled with each other while retained in the v-shaped grooves 50, and the forward movement of the cleat 70 will often operate to further unscramble the separated tubes from each other. As the cleats 70 engage with a tangled portion of separated tubes 78, because of the height of the cleats 70, the cleats 70 will only engage the bottom layer of the tangled separated tubes. Then, as the cleats 70 are conveyed forward and upward, gravity will assist in loosening the upper layer tubes from the portion of separated tubes 78, and will cause upper layer tubes loosened from the separated portion 78 to roll over the cleats and down to the main bundle 76 or back into the v-shaped grooves 50.

During this conveying step, another conventional optical sensor 84 is preferably positioned to detect the height of the separated tubes 78 being conveyed by the cleats 70 from the v-shaped grooves 50 as they approach the roller drums 54. If the separated tubes 78 are still twisted or tangled around each other upon reaching the roller drum 54, the height of the tubes being conveyed from the ramp 28 will be detected to be higher than the diameter of one of the tubes. If the height detected by the photo-sensor 84 is greater than the diameter of one of the tubes, the belts 64 will be slackened again such that the cleats disengage from the separated tubes 78 and such that the separated tubes are redeposited in the v-shaped grooves 50. Once the separated tubes 78 have been redeposited, the belts 64 are then driven forward again to repeat the conveying step. The above detecting, slackening and conveying steps will be repeated in this manner until the height of the portion of tubes being conveyed over the roller drums 54 and onto the storage ramp or bar feeder 82 is detected to be the diameter of one tube.

After the conveying step, sensor 80, will detect if any tubes have fallen back into the v-shaped groove during the conveying step, and if any such tubes are detected, the conveying step can be repeated to convey these tubes to the storage ramp or bar feeder 82.

At this point, it should be apparent that the belts 64 can be continued to be driven forward over the roller drums 54 after the conveying step, until the bundle 76 is expanded and lifted over the ramps 28. Thus, if desired, the expanding step may be performed after the conveying step without having to slacken the belts again after the conveying step.

In any event, once all of the separated tubes 78 have been discharged from the v-shaped grooves 50, the steps of expanding, separating and discharging may be repeated again until the desired amount of tubes have been discharged onto the storage ramp or bar feeder 82, or until the bundle 76 has been completely untangled and discharged.

Finally, it should be apparent that by feeding the outputs of the sensors 80, 84 into a computer system (not shown) having a conventional control program running thereon, the above procedure can be completely or substantially automated. Three additional sensors (not shown) would also facilitate the automation: a "bundle full-up" proximity switch or sensor, a "bundle down" proximity switch or sensor, and a "feeder magazine full" proximity switch or sensor. The "bundle full-up" proximity switch would indicate that the belts 64 have been tightened to a predetermined extent such that the bundle 76 has been sufficiently expanded and lifted over the ramps 28 and ridges 48 as shown, for example, in FIG. 4. The "bundle down" proximity switch would indicate when the belts 64 have been slackened to a predetermined extent such that the bundle 76 rests on the ramps 28 below the ridges 48, usually indicating an initial position as shown, for example, in FIG. 6. The "feeder magazine full" proximity switch preferably monitors a point on the storage ramp or bar feeder 82, and is set by detecting a tube on the storage ramp or bar feeder 82 at that point. The point indicating where the last bar of a full feeder magazine would reside. Therefore, when the storage ramp or bar feeder 82 is full, the "feeder magazine full" proximity switch will remain set until a tube can be taken from the storage ramp or bar feeder. The "feeder magazine full" proximity switch can also indicate when a tube is discharged onto the storage ramp or bar feeder 82, because it will toggle every time a tube rolls by the monitored point on the storage ramp or bar feeder.

Figure 8:
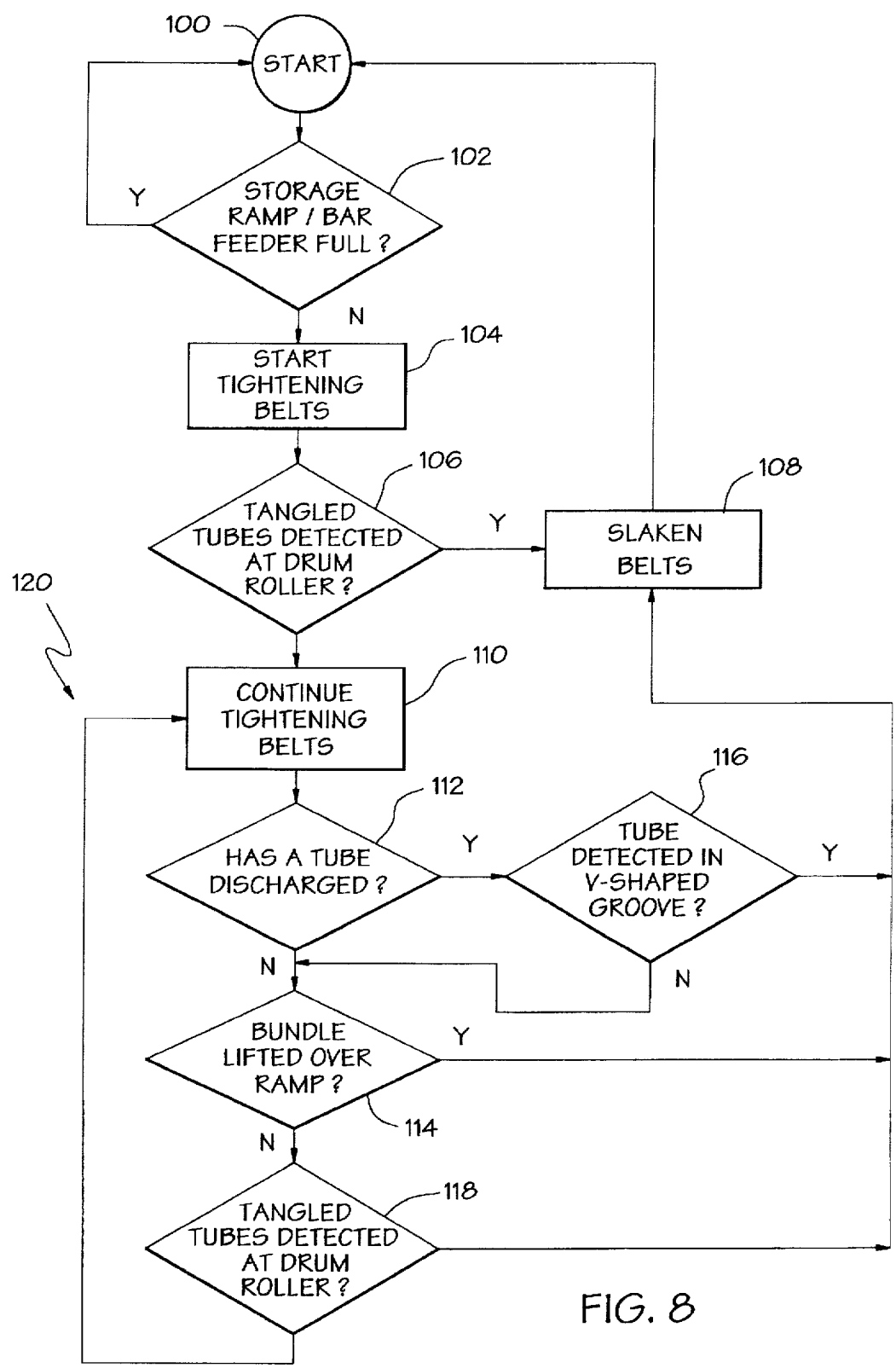
FIG. 8 is a flowchart of the operation of the apparatus of the present invention.

As shown in FIG. 8, a control program would generally operate as follows: The program is a continuous loop beginning with step 100 in which the extended portions 66 of the belts 64 have been sufficiently slackened such that the bundle 76 rests against the upper surfaces 41 of the ramps, below the ridges 48 and approximate the aft support columns 20. In this initial position the "bundle down" proximity switch is set. At step 102 the program will check the state of the "feeder magazine full" proximity switch. If this switch is set, meaning that the storage ramp or bar feeder 82 cannot accept additional tubes, the process will return to step 100. Once the "feeder magazine full" proximity switch is detected to be reset, meaning that the storage ramp or bar feeder 82 has room for more tubes to be discharged thereon, the program will advance to step 104 and begin tightening the belts 64.

Because the program is a continuous loop, separated tubes 78 may be present in the v-shaped grooves 50 during this belt tightening step 104. Therefore, if the optical sensor 84 detects tangled tubing being conveyed over the roller drum 54 by the cleats 70, in step 106, the program will advance to step 108 in which the belts are slackened again until the "bundle down" proximity switch is set, returning again to the initial step 100. Thus, the program, in steps 100–106, facilitates the process described above in which the cleats 70, during successive tightening and slackening of the belts 64, act to unscramble the separated tubes 78 deposited in the v-shaped grooves 50 if necessary.

If at step 106 tangled tubes are not detected by the optical sensor 84, the program advances to step 110 in which the belts are continuously tightened, in a secondary program loop 120 (comprising steps 110–118), until one of three conditions are met. The first condition, as shown in step 112, is a detection that the "feeder magazine full" proximity switch either toggled or has been set, indicating that a tube has been discharged over the drum roller 54 and onto the storage ramp or bar feeder 82. If a tube discharge has been detected, the program advances on to step 116 to detect, using optical sensor 80, whether tubes still reside in the v-shaped grooves 50. If tubes are detected in the v-shaped grooves, the program advances to step 108 to slacken the belts again to the initial position, such that the remaining belts can be discharged from the v-shaped grooves. On the other hand, if no tubes are detected in the v-shaped grooves the program returns to the secondary program loop 120 at step 114.

A second condition monitored in the secondary program loop 120 is whether the "bundle full-up" proximity switch is set at step 114, meaning that the belts 64 have been sufficiently tightened such that the bundle 76 is lifted over the ramps 28 and ridges 48 in the expanded state. If the "bundle full-up" proximity switch is detected as set the program will then exit from the secondary program loop 120 to advance on to step 108 where the belts will be slackened again. When step 108 immediately follows step 114, the expanded bundle 76 will be lowered onto the ridges 48 which act to separate tubes from the bundle 76; and as the bundle is lowered further, the v-shaped grooves 50 act to retain the separated tubes 78 as described previously.

A third condition being monitored in the secondary program loop 120, in step 118, is whether tangled tubes are detected as being conveyed over the roller drum 54 by the optical sensor 84 (similar to step 106). If tangled tubes are detected at step 118, the process exits from the secondary program loop 120 to advance to step 108.

Having described the invention in detail and by reference to the figures, it will be apparent that modification and variations are possible without departing from the scope of the invention as defined in the following claims.

What is claimed is:

1. A method for unscrambling tubes from a bundle of tubes, the bundle being initially positioned in a belt magazine formed by at least two belts extending parallel to each other, each of the belts having a portion suspended between at least one elevated aft support member and at least one elevated forward support member, the bundle being placed in the belt magazine such that the bundle extends longitudinally in a direction perpendicular to the belts, the method comprising the steps of:

laterally expanding the bundle by tightening the suspended portion of the belts;

separating a portion of the tubes from the expanded bundle by lowering the expanded bundle between the aft and forward support members such that a portion of the tubes contact and are retained by at least one retainer positioned between the belts; and discharging the separated portion of tubes from the retainer.

2. The method of claim 1, wherein the bundle is lifted above the retainer by said expanding step.

3. The method of claim 1, wherein the retainer is a ramp.

4. The method of claim 1, wherein:

a ramp is positioned between the belts;

the bundle is lifted over the ramp by said expanding step;

and the bundle is partially supported by the ramp prior to being lifted over the ramp.

5. The method of claim 1, wherein said steps of expanding, separating and discharging are repeated.

6. The method of claim 1, wherein:

said expanding step includes the step of reducing the length of the suspended portion of the belts; and said separating step includes the step of increasing the length of the suspended portion of the belts.

7. The method of claim 1, wherein at least two of the belts includes a cleat, and said discharging step includes the steps of:

engaging the separated portion of tubes with the cleats; and conveying the separated portion of tubes from the retainer to a discharge point by tightening the suspended portion of the cleated belts.

8. The method of claim 2, wherein:

said expanding step includes the step of reducing the length of the suspended portion of the belts;

said separating step includes the step of increasing the length of the suspended portion of the belts; and said engaging and said conveying steps include the step of reducing the length of the suspended portion of the cleated belts.

9. The method of claim 1, wherein:

the retainer is a ramp having an upper surface and a projection extending from the upper surface, forming a v-shaped groove on the upper surface of the ramp;

the separated portion of tubes are separated from the bundle by the projection as the bundle is lowered onto the ramp during said separating step; and the separated portion of tubes are retained on the ramp by the groove.

10. The method of claim 9, wherein the bundle is lifted above the projection by said expanding step.

11. The method of claim 1, wherein:

the retainer is a ramp having an upper surface and an intermediate wedge projecting from the upper surface, the ramp being sloped upwardly towards the forward support member;

the wedge having a forward surface which intersects the upper surface of the ramp forming a v-shaped groove;

the bundle is lifted above the wedge by said expanding step;

the separated portion of tubes are separated from the bundle by the wedge as the bundle is lowered onto the ramp during said separating step; and the separated portion of tubes are retained on the ramp by the groove.

12. The method of claim 11, further comprising the steps of:

detecting whether the groove retains any tubes; and if retained tubes are not detected, then repeating said expanding and separating steps.

13. The method of claim 11, wherein at least two of the belts includes a cleat, and said discharging step includes the steps of engaging the separated portion of tubes with the cleats; and conveying the separated portion of tubes from the groove to a discharge point by driving the suspended portion of the cleated belts forward.

14. The method of claim 13, further comprising the steps of:

during said conveying step, detecting whether the separated portion of tubes being conveyed by the cleats has a height greater than a diameter of one of the tubes;

if the detected height is greater than the diameter of one of the tubes, then slackening the suspended portion of the cleated belts such that the cleats disengage from the separated portion of tubes; and then repeating said engaging and conveying steps.

15. The method of claim 13, wherein said steps of expanding, separating, engaging and conveying are repeated.

16. An apparatus for separating tubes from a bundle of tubes, comprising:

at least one elevated forward belt-support frame member;

at least one elevated aft belt-support frame member;

at least two flexible belts extending parallel to each other and suspended between said forward and said aft frame members, said belts forming a belt magazine for supporting the bundle of tubes which extend longitudinally in a direction perpendicular to said belts;

at least one ramp positioned longitudinally between an adjacent two of said belts and sloping upward towards said forward frame members, said ramp having a base, an apex, an upper surface and a protection extending from said upper surface between said base and said apex, said protection having a forward face intersecting said upper surface of said ramp to form a v-shaped groove; and means for tightening and slackening said belts between said forward and aft frame members;

whereby tightening said belts causes the bundle to be guided up said ramp and lifted over said projection, subsequently slackening said belts causes a portion of the bundle to be lowered onto said projection such that said protection separates a portion of the tubes from the bundle as the bundle is lowered below said protection, and such that said groove retains the separated tubes on said ramp.

17. The apparatus of claim 16, wherein said ramp slopes upwards, between said base and said projection, at a first angle, said angle being from 35° to 40°.

18. The apparatus of claim 17, wherein said ramp slopes upwards, between said projection and said apex, at a second angle smaller than said first angle.

19. The apparatus of claim 16, further comprising a conveyor for conveying tubes from said groove to a discharge point adjacent to said forward frame member.

20. The apparatus of claim 19, wherein, said belts have an inner, bundle-receiving surface and at least two of said belts have a cleat fastened respectively to said inner surfaces; and said conveyor comprises said cleated belts.

21. The apparatus of claim 16, further comprising a means for conveying tubes from said groove to a discharge point adjacent to said forward frame member.

22. The apparatus of claim 21, wherein, said belts have an inner, bundle-receiving surface and at least two of said belts have a cleat fastened respectively to said inner surfaces; and said conveying means comprises said cleated belts;

whereby tightening said cleated belts causes said cleats to engage tubes in said groove and convey the tubes from said groove to said discharge point.

23. The apparatus of claim 22, wherein, the tubes have a diameter; and said cleats have a height approximately equal to said diameter.

24. An apparatus for separating tubes from a bundle of tubes, comprising:

a frame having a forward portion and an aft portion;

a plurality of elevated drums rotatably mounted along a first axis extending through said forward portion of said frame;

a plurality of elevated attachment points located along a second axis extending through said aft portion of said frame, said second axis being parallel to said first axis, and each of said attachment points being longitudinally aligned with a corresponding one of said drums;

a plurality of flexible belts extending parallel to each other, said belts having a first end attached to a corresponding one of said attachment points, and having a point distal to said first end engaged with a corresponding one of said drums, each of said belts having a suspended portion between said corresponding attachment point and drum, and each of said suspended portions being substantially equal in length, said belts forming a belt magazine for retaining the bundle of tubes extending longitudinally in a direction parallel to said first and second axes;

a plurality of ramps, each adjacent pair of said suspended portions of said belts having one of said ramps positioned longitudinally therebetween, each of said ramps having a base, an apex and an upper surface, each of said ramps sloping upward towards said first axis, and each of said ramps having a projection extending from said upper surface between said base and said apex, each of said projections having a forward face intersecting said upper surface of said ramp to form a v-shaped groove on each of said ramps; and means for moving said belts around said drums in both forward and aft directions such that said suspended portions of said belts will be respectively tightened and slackened;

whereby moving said belts forward around said drums causes the bundle to be guided up said ramps and lifts and expands the bundle over said projections, subsequently moving said belts aftward around said drums causes the bundle to be lowered below said projections such that the projections separate a portion of the tubes from the bundle and such that the separated portion of tubes will be retained in said grooves.

25. The apparatus of claim 24, wherein:

a feeder magazine ramp is positioned adjacent to said drums;

said belts have an upper surface; and at least two of said belts have cleats fastened respectively to said belt upper surface;

whereby moving said cleated belts forward around said drums causes said cleats to engage tubes deposited in said grooves and convey the engaged tubes to said feeder magazine ramp.

26. The apparatus of claim 25, further comprising:

a first sensor to detect the presence of tubes in said grooves, said first sensor having a first sensor signal;

a second sensor to detect the height of tubes being conveyed from said grooves, said second sensor having a second sensor signal; and a means for automatically controlling said belt moving means in response to said first and second sensor signals.

27. An apparatus for separating tubes from a bundle of tubes, comprising:

at least one elevated forward belt-support frame member;

at least one elevated aft belt-support frame member;

at least two flexible belts extending parallel to each other and suspended between said forward and said aft frame members, said belts forming a belt magazine for supporting the bundle of tubes which extend longitudinally in a direction perpendicular to said belts, and said belts having an inner, bundle-receiving surface;

at least one retainer positioned longitudinally between an adjacent two of said belts; and means for tightening and slackening said belts between said forward and aft frame members;

wherein at least two of said belts have a cleat fastened respectively to said inner surfaces of said belts for conveying tubes from said retainer to a discharge point adjacent to said forward frame member.

28. The apparatus of claim 27, wherein, the tubes have a diameter; and said cleats have a height approximately equal to said diameter.

29. The apparatus of claim 28, further comprising:

a first sensor to detect the presence of tubes retained by said retainer;

a second sensor to detect the height of tubes being conveyed from said retainer by said cleated belts; and a means for automatically controlling said belt tightening and slackening means in response to said first and second sensor signals.

30. An apparatus for separating tubes from a bundle of tubes, comprising:

at least one elevated forward belt-support frame member;

at least one elevated aft belt-support frame member;

at least two flexible belts extending parallel to each other and suspended between said forward and said aft frame members, said belts forming a belt magazine for supporting the bundle of tubes which extend longitudinally in a direction perpendicular to said belts;

at least one retainer positioned longitudinally between an adjacent two of said belts;

means for tightening and slackening said belts between said forward and aft frame members; and at least one ramp positioned longitudinally between an adjacent two of said belts, sloping upwards towards said forward frame member, and positioned such that said ramp provides support for said bundle in said belt magazine;

whereby slackening of said belts allows the bundle to be lowered onto said ramp such that said ramp provides support for and acts to laterally condense the bundle, subsequent tightening of said belts causes the bundle to be guided up said ramp and lifted over said retainer allowing the bundle to laterally expand, and subsequent slackening said belts causes at least a portion of the expanded bundle to be lowered onto said retainer such that said retainer retains said portion of the tubes.

31. A method for unscrambling tubes from a bundle of tubes, the bundle being initially positioned in a belt magazine formed by at least two belts, each of the belts having a portion suspended between at least one elevated aft support member and at least one elevated forward support member, the bundle being placed in the belt magazine such that the bundle extends longitudinally across the suspended portions of the belts, the method comprising the steps of:

laterally expanding the bundle by tightening the suspended portion of the belts;

separating a portion of the tubes from the expanded bundle by lowering the expanded bundle between the aft and forward support members such that a portion of the tubes contact and are retained by at least one retainer positioned between the belts; and discharging the separated portion of the tubes from the retainer.

* * * * *

UNITED STATES PATENT AND TRADEMARK OFFICE
CERTIFICATE OF CORRECTION

PATENT NO. : 5,641,263
DATED : June 24, 1997
INVENTOR(S) : Joseph Ogrinc et al.

It is certified that error appears in the above-indentified patent and that said Letters Patent is hereby corrected as shown below:

Claim 16, Col. 10, Lines 4, 6, 15 and 16 word "protection" should be --projection--.

Signed and Sealed this

Ninth Day of September, 1997

Attest:

BRUCE LEHMAN

Attesting Officer

Commissioner of Patents and Trademarks